United States Patent [19]

Perlman et al.

[11] Patent Number: 5,781,534
[45] Date of Patent: *Jul. 14, 1998

[54] METHOD AND APPARATUS FOR DETERMINING CHARACTERISTICS OF A PATH

[75] Inventors: Radia J. Perlman, Acton, Mass.; Neal D. Castagnoli, Morgan Hill, Calif.

[73] Assignee: Novell, Inc., Provo, Utah

[*] Notice: This patent issued on a continued prosecution application filed under 37 CFR 1.53(d), and is subject to the twenty year patent term provisions of 35 U.S.C. 154(a)(2).

[21] Appl. No.: 550,981

[22] Filed: Oct. 31, 1995

[51] Int. Cl.⁶ ..................................................... H04L 12/56
[52] U.S. Cl. .......................... 370/248; 370/252; 370/401; 370/465
[58] Field of Search ........................... 370/248, 249, 370/350, 351, 389, 392, 393, 400–402, 408, 352, 354, 252, 465, 469–471; 395/309, 311; 340/825, 825.01, 825.02, 825.03, 826

[56] References Cited

U.S. PATENT DOCUMENTS

| | | | |
|---|---|---|---|
| 5,128,926 | 7/1992 | Perlman et al. | 370/248 |
| 5,251,205 | 10/1993 | Callon et al. | 370/392 |
| 5,394,393 | 2/1995 | Brisson et al. | 370/392 |
| 5,442,633 | 8/1995 | Perkins et al. | 370/389 |
| 5,455,865 | 10/1995 | Perlman | 370/389 |
| 5,477,531 | 12/1995 | McKee et al. | 370/249 |
| 5,550,827 | 8/1996 | Fernstrom | 370/392 |
| 5,570,084 | 10/1996 | Ritter et al. | 370/389 |
| 5,596,574 | 1/1997 | Perlman et al. | 370/389 |

OTHER PUBLICATIONS

S. Deering, "*ICMP Router Discovery Messages*", Sep. 1991.

R. Perlman, "*Interconnections, Bridges and Routers*", pp. 178–184, 1992.

Primary Examiner—Benedict V. Safourek
Assistant Examiner—Seema S. Rao
Attorney, Agent, or Firm—Cesari and McKenna, LLP

[57] ABSTRACT

An information gathering mechanism efficiently acquires information about a path interconnecting a source node and a destination node in a computer network. The mechanism comprises a novel packet configuration for soliciting parameters pertaining to network characteristics from routers coupled to the path. This novel probe packet preferably has a flexible format so that it may be processed not only by routers configured to interpret this type of packet, but also those that are incapable of either supplying some of the parameters or, further, deciphering any of the contents of the packet.

12 Claims, 7 Drawing Sheets

METHOD AND APPARATUS FOR DETERMINING CHARACTERISTICS OF A PATH

FIELD OF THE INVENTION

This invention relates generally to computer networks and, more particularly, to collecting information about a path of a computer network.

BACKGROUND OF THE INVENTION

A computer network is a geographically distributed collection of interconnected communication links for transporting data between nodes, such as computers. A plurality of computer networks may be further interconnected by intermediate nodes, or routers, to create an extended network having a "mesh" topology of paths coupling the nodes. These nodes typically communicate by exchanging discrete "packets" of data according to predefined protocols. In this context, a protocol consists of a set of rules defining how the nodes interact with each other.

In order to reduce design complexity, most networks are organized as a series of hardware and software levels or "layers" within each node. These layers interact to format data for transfer between, e.g., a source node and a destination node communicating over the network. Specifically, predetermined services are performed on the data as it passes through each layer and the layers communicate with each other by means of the predefined protocols. This layered design permits each layer to offer selected services to other layers using a standardized interface that shields those layers from the details of actual implementation of the services.

In an attempt to standardize network architectures, i.e., the sets of layers and protocols used within a network, a generalized model has been proposed by the International Standards Organization (ISO). The model, called the Open Systems Interconnection (OSI) reference model, is directed to the interconnection of systems that are "open" for communication with other systems. The proposed OSI model has seven layers which are termed, in ascending interfacing order, the physical, data link, network, transport, session, presentation, and application layers. These layers are arranged to form a "protocol stack" in each node of the network.

Figure 1:
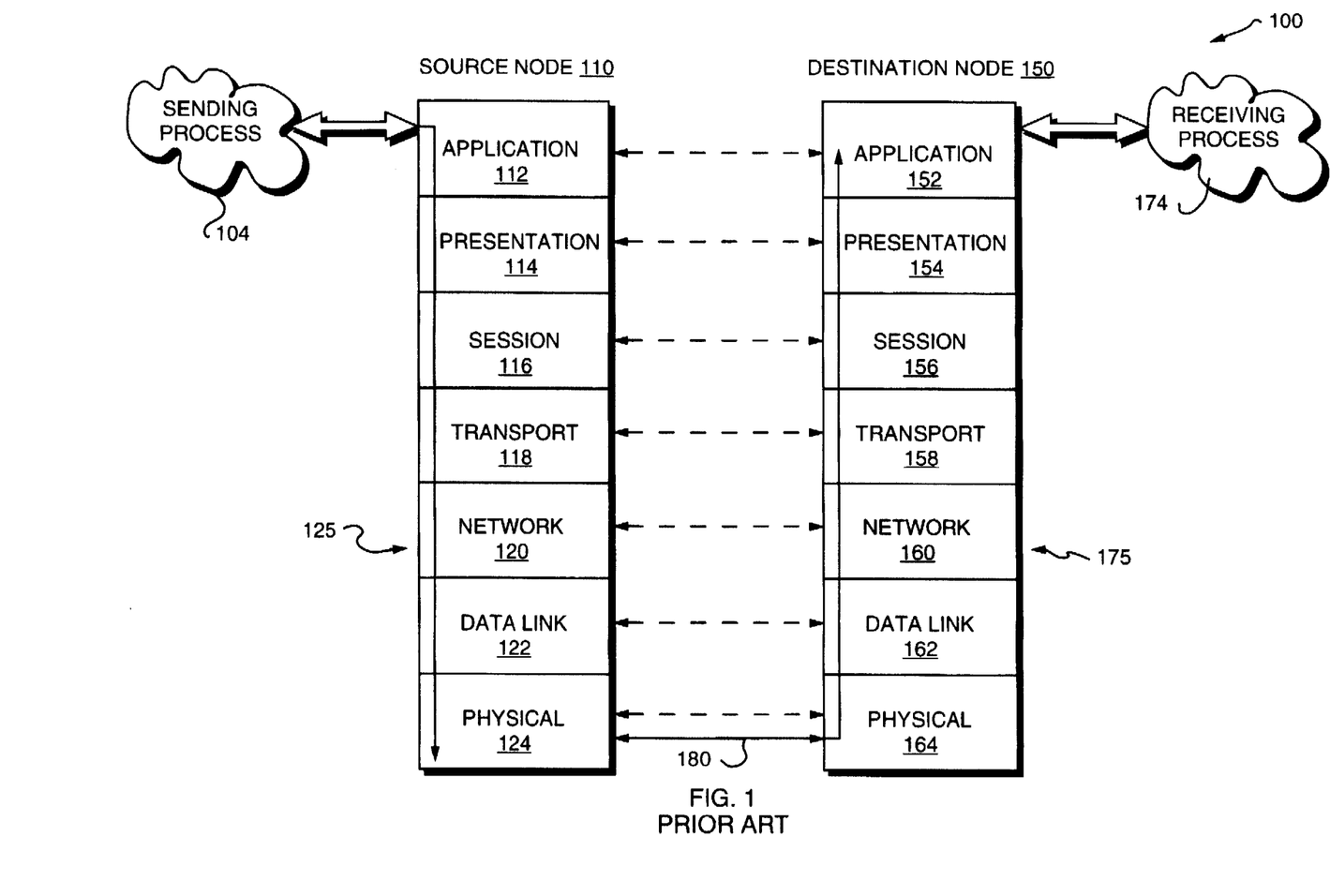
FIG. 1 is a schematic block diagram of prior art protocol stacks used to transmit data between a source node and a destination node of a computer network.

FIG. 1 illustrates a schematic block diagram of prior art protocol stacks 125 and 175 used to transmit data between a source node 110 and a destination node 150, respectively, of a computer network 100. Each protocol stack is structured according to the OSI seven-layer model; accordingly, each stack comprises a collection of protocols, one per layer. As can be seen, the protocol stacks 125 and 175 are physically connected through a communications channel 180 at the physical layers 124 and 164. For ease of description, the protocol stack 125 will be described.

Broadly stated, the physical layer 124 transmits a raw data bit stream over a communication channel 180, while the data link layer 122 manipulates the bit stream and transforms it into a datastream that appears free of transmission errors. This latter task is accomplished by dividing the transmitted data into frames and transmitting the frames sequentially, accompanied with error correcting mechanisms for detecting or correcting errors. The network layer 120 routes data packets from the source node to the destination node by selecting one of many alternative paths through the physical network. The transport layer 118 accepts the datastream from the session layer 116, apportions it into smaller units (if necessary), passes the smaller units to the network layer 120 and provides appropriate mechanisms to ensure that all the units arrive correctly at the destination.

The session layer 116 establishes data transfer "sessions" between software processes on the source and destination nodes, along with management of such sessions in an orderly fashion. That is, a session not only allows ordinary data transport between the nodes, but it also provides enhanced services in some applications. The presentation layer 114 performs frequently-requested functions relating to the presentation of transmitted data, including encoding of data into standard formats, while the application layer 112 contains a variety of protocols that are commonly needed by processes executing on the nodes.

Data transmission over the network 100 therefore consists of generating data in, e.g., a sending process 104 executing on the source node 110, passing that data to the application layer 112 and down through the layers of the protocol stack 125, where the data are sequentially formatted as a packet for delivery onto the channel 180 as bits. Those packet bits are then transmitted to the protocol stack 175 of the destination node 150, where they are passed up that stack to a receiving process 174. Data flow is schematically illustrated by solid arrows.

Although actual data transmission occurs vertically through the stacks, each layer is programmed as though such transmission were horizontal. That is, each layer in the source node 100 is programmed to transmit data to its corresponding layer in the destination node 150, as schematically shown by dotted arrows. To achieve this effect, each layer of the protocol stack 125 in the source node 110 typically adds information (in the form of a header field) to the data packet generated by the sending process as the packet descends the stack. At the destination node 150, the various headers are stripped off one-by-one as the packet propagates up the layers of stack 175 until it arrives at the receiving process.

As noted, a significant function of each layer in the OSI model is to provide services to the other layers. Two types of services offered by the layers are "connection-oriented" and "connectionless" network services. In a connection-oriented service, the source node establishes a connection with a destination node and, after sending a packet, terminates the connection. The overhead associated with establishing the connection may be unattractive for nodes requiring efficient communication performance. For this case, a fully connectionless service is desirable where each transmitted packet carries the full address of its destination through the network.

Network layer protocols are generally used to implement a connectionless network service, the latter of which primarily defines a packet format. When the network layer receives a packet from the transport layer for transmission over the network, it adds (to the packet) a header containing, inter alia, source and destination addresses. Examples of network layer protocols are the connectionless network layer protocol (CLNP) defined by ISO, the Internet (IP) network layer protocol and the Internet Packet Exchange (IPX) protocol.

The header fields defined by the network layer services are generally the same primarily because the same information are typically contained in each packet. For example, most of these headers contain a mechanism for ensuring that packets do not circulate endlessly (i.e., loop) around paths of the mesh-topology network. In the case of IP or CLNP headers, the mechanism is a field called a "time-to-live" field or a "lifetime" field, respectively, whereas for an IPX header, the field is a "hop count" field. Typically, each field is initialized to a first predetermined value by a source node and is successively decremented (or incremented) by routers until it reaches a second predetermined value, at which time the packet is discarded.

In the case of connectionless network protocols, it is rather difficult to acquire useful characteristics pertaining to a particular network path primarily because software in the routers are not designed to perform such functions. It may be desirable, however, for a source to assess such network characteristics as maximum packet size and the presence of packet filters or dial links along a path to a destination node. This information may be used by distributed applications to determine optimal routes for synchronization purposes.

An example of a technique for uncovering the identities of routers along a network path is an IP protocol technique known as trace route. Here, a source node transmits a packet over the network having a hop count (time-to-live or lifetime) field whose contents are preferably decremented by each router receiving the packet. Upon receiving a packet whose hop count contents are zero ("0"), the router discards the packet and generates an error message that is returned to the source.

Specifically, the hop count of a packet destined for a particular destination node may be initially set to one ("1"), i.e., the packet will "expire" in one hop, and the packet is forwarded over the network. The first router R1 receives the packet, returns an error message to the source and then discards the packet. Upon receiving the error message from R1, the source associates R1 as the first hop on the path. The source then initializes another packet intended for the destination with a hop count=2 and, in accordance with the above-described procedure, ascertains that R2 is the second router on the path. This procedure continues until the packet eventually reaches its destination.

The trace route technique is limited in that it only collects the identities (e.g., addresses) of routers along a path; it does not collect other relevant characteristics of the network, such as maximum packet size, bandwidth and link cost parameters. Yet, once the source is aware of the routers coupled to the path, it may solicit the desired information individually from each router. That is, the source may issue a network management message to each router requesting the desired parameters. In response to this request, each router capable of supplying the parameters returns a packet to the source containing that information.

Thus, although the trace route technique facilitates "manual" collection of the information, additional message exchanges are required between the source and routers to exchange the requested information. Such exchanges consume both processing resources in the nodes and bandwidth over the network.

SUMMARY OF THE INVENTION

The invention comprises a mechanism for efficiently acquiring information about a path interconnecting a source node and a destination node in a computer network. The mechanism comprises a novel packet configuration for soliciting parameters pertaining to network characteristics from "hops", i.e., routers, coupled to the path. This novel probe packet preferably has a flexible format so that it may be processed not only by routers configured to interpret this type of packet, but also those that are incapable of either supplying some of the parameters or, further, deciphering any of the contents of the packet.

According to an aspect of the invention, the probe packet contains a source instruction area and a recording area appended to a network layer header. Specifically, the source instruction area contains a list of the network parameters to be collected, along with a list of hops for providing those parameters. This area also includes a field specifying a hop count at which to start collecting the parameters which, according to the illustrative embodiment, are specified by codes, e.g., code A. Examples of the solicited parameters include (i) the router's address; (ii) on-demand link cost; (iii) maximum packet size; (iv) amount of bandwidth reserved; and (v) cost of utilizing a link.

The recording area, on the other hand, contains a pointer field whose contents specify an offset address to the next area that is available for a router to supply its parameters. After each router "writes" its parameter information to the specified area, it increments the contents of the pointer field to reference the next area that is available for a next router to supply the requested information.

In another aspect of the invention, the probe packet is further marked to identify the packet as an information gathering mechanism. In the illustrative embodiment, the network layer header preferably contains an identifying mark provided by a source node when generating the probe packet having an address of a destination node. For network layer headers, such as IPX, CLNP and IP headers, the mark is preferably a new option type.

Operationally, the source launches its probe packet over the network where it is received by a first router. That router initially examines the packet to determine if it is a probe packet and, upon identifying this type of packet, checks the hop list to determine if the first router (i.e., starting hop count=1) is requested to supply information. If so, that router examines the list of network parameters and proceeds to supply the information by writing it to the recording field referenced by the pointer. The first router then identifies itself as the supplier of the information by leaving its "signature" prior to incrementing the pointer to the next available field of the recording area and forwarding the packet on to the next router. In accordance with the invention, a router that is not configured to interpret the probe packet merely forwards that packet over the network to the next hop without modifying the recording area field.

Advantageously, routers that are configured to interpret the "marks" and accompanying network parameters of the novel probe packets may cooperate with these information gathering mechanisms to supply significant information about a path in effectively one network operation. These mechanisms are preferably configured to be backward compatible with routers unable to decipher the contents of the probe packets; accordingly, such routers merely forward the packets on to the specified destination addresses. Moreover, the probe packet has a flexible construction in that new capabilities may be continuously added for utilization by updated routers, while whatever information is capable of being supplied by "old" routers may be collected at a source.

BRIEF DESCRIPTION OF THE DRAWINGS

The above and further advantages of the invention may be better understood by referring to the following description in conjunction with the accompanying drawings, in which like references indicate similar elements, and in which.

DETAILED DESCRIPTION OF ILLUSTRATIVE EMBODIMENT

Figure 2:
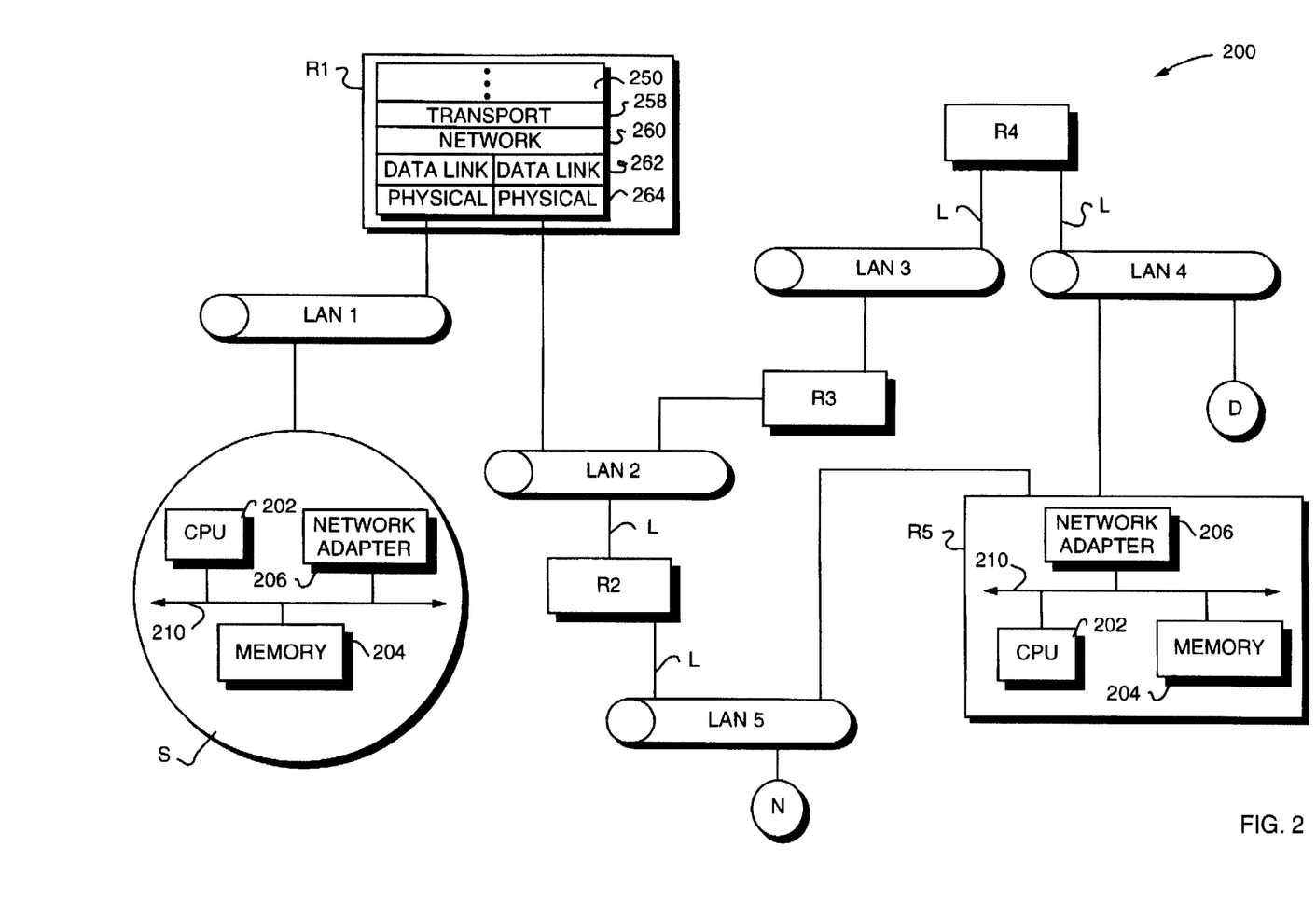
FIG. 2 is a block diagram of a mesh-topology computer network in which a novel information gathering mechanism of this invention may be advantageously used.

FIG. 2 is a block diagram of a mesh-topology computer network 200 of interconnected nodes in which the novel information gathering mechanism may be advantageously used. The nodes are typically general-purpose computers comprising a source node S, an end node N, a destination node D and a plurality of intermediate nodes, e.g., routers, R1-R5. Each router node is configured to facilitate the flow of information throughout the network 200 by providing, along with its incoming and outgoing communication links L, connection paths between the source and destination nodes.

Each node further comprises a central processing unit (CPU) 202, a memory unit 204 and at least one network adapter 206 interconnected by a system bus 210. The memory unit 204 may comprise storage locations typically composed of random access memory (RAM) devices, which are addressable by the CPU 202 and network adapter 206. An operating system, portions of which are typically resident in memory and executed by CPU, functionally organizes the node by, inter alia, invoking network operations in support of processes executing in the CPU.

The computer networks included within system 200 are local area networks (LANs) 1-5 interconnected by intermediate nodes R1-R5, which are preferably routers. Communication among the nodes of the network 200 is typically effected by exchanging discrete data "packets" among the nodes. The routers facilitate the flow of these data packets throughout the network by routing the packets to the proper receiving nodes.

In general, when a source node S transmits a packet over LAN 1, the packet is sent to all nodes on that LAN. If the intended recipient of the packet is connected to LAN 5, the packet is routed through router R1, over LAN 2 and through R2 onto LAN 5. A key function of a router is determining the next node to which the packet is sent; this routing function is preferably performed by network layer 260 of a protocol stack 250 within each node.

Specifically, when source node S sends a packet to a destination node N, the packet is transmitted onto LAN 1 with a next destination address specifying the address of router R1. Address information embedded in the packet, which is processed by the higher-layer software of the protocol stack 250, identifies the final destination of the packet as node N. Based on this information, R1 determines that the next node along the route is router R2 and proceeds to pass the packet onto LAN 2 for reception by that node. Router R2 then determines that the next node is the destination node N and transmits the packet over LAN 5 to node N.

For the routers to be used in network 200, the interconnected LANs must share the same network layer protocols and must be compatible at the higher protocol stack layers. The networks may, however, differ at the data link layer 262 and the physical layer 264, as shown schematically in the protocol stack 250 of R1 which couples LAN 1 to LAN 2. The routers may operate with network layer protocols such as the connectionless network layer protocol (CLNP) and the Internet (IP) network layer protocol; however, in the illustrative embodiment described herein, the network layer protocol is preferably the Internet Packet Exchange (IPX) protocol.

Figure 3A:
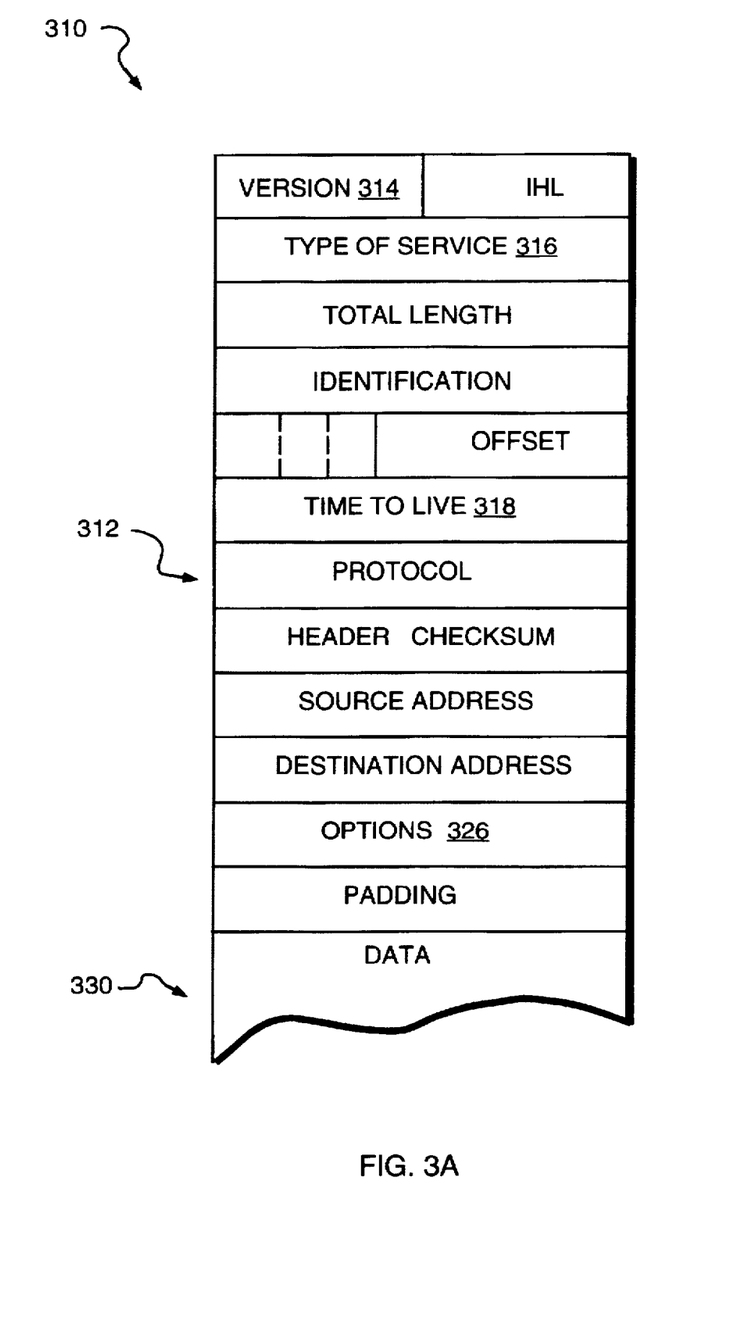
FIGS. 3A-3C are schematic diagrams depicting the formats of conventional network layer headers having options fields for utilizing a packet as the information gathering mechanism for network path characteristics in accordance with the invention.
Figure 3B:
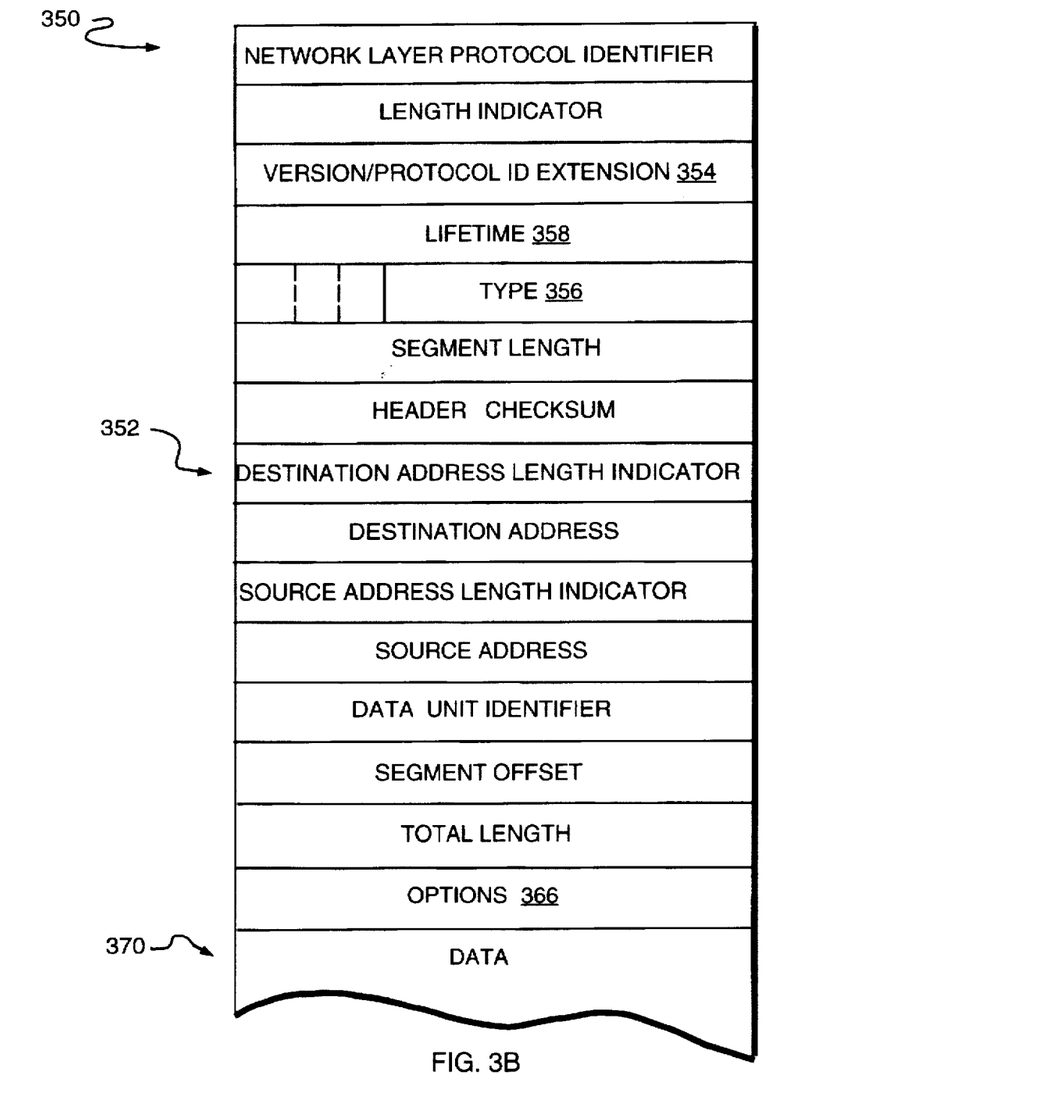

As noted, when the network layer 260 receives a packet from the transport layer 258 for transmission over the network, it adds a network layer header. The formats of these header fields are generally the same among all network layer services primarily because the same information are typically contained in each packet. FIGS. 3A and 3B depict the formats of IP and CLNP network layer packets 310 and 350, respectively. It can be seen that both of these packets contain similar information in their headers 312 and 352 (e.g., time-to-live field 318 and lifetime field 358) for ensuring that packets do not endlessly loop around paths of the mesh-topology network 200.

Figure 3C:
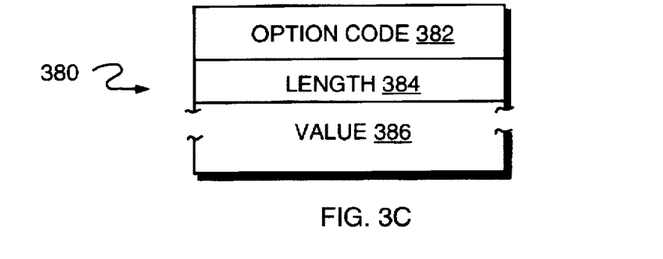

Each header further includes an options field 326 and 366 to accommodate added features. The types of options supported by these fields typically include source routing, priority and security-specific information. FIG. 3C depicts the general format of the contents of an options field 380 which comprises an octet (1-byte) option code field 382 that uniquely defines a type of option, a 1-byte length field 384 indicating the length of the option in bytes, and a variable, e.g., 0-254 byte, value field 386.

Figure 4:
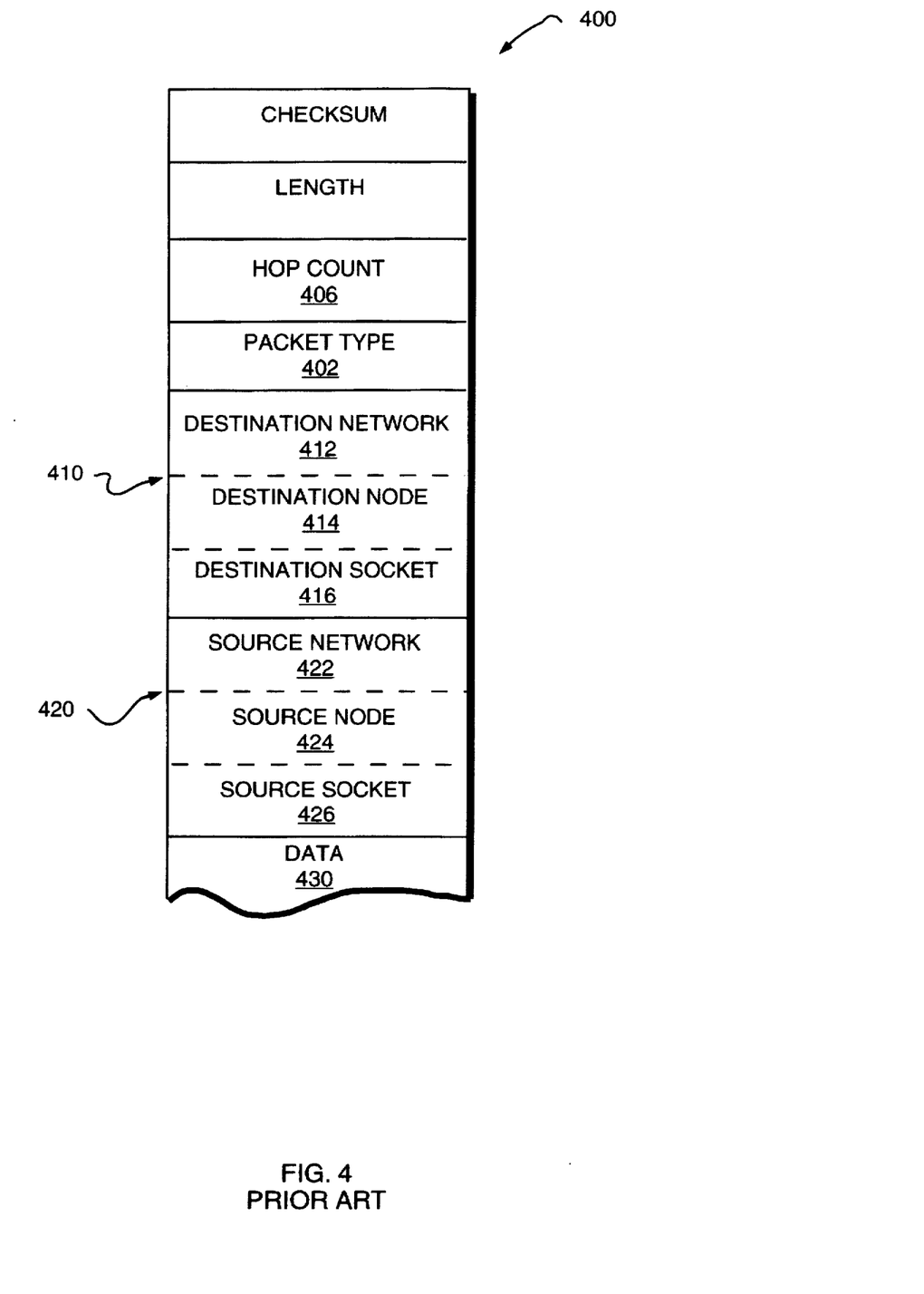
FIG. 4 is a schematic diagram depicting the format of a conventional IPX network layer header.

FIG. 4 is a schematic diagram depicting the format of a conventional IPX packet 400 having a network layer header comprising, inter alia, a packet type field 402 and a hop count field 406, the latter field providing, as in the cases of the IP and CLNP network layer headers, a mechanism for ensuring that packets do not endlessly loop around paths of the network 200. As with the previous headers, the hop count field 406 is initialized to a first predetermined value by a source node and is successively decremented (or incremented) by routers until it reaches a second predetermined value, at which time the packet is discarded.

In addition, the IPX header includes hierarchical destination and source addresses, each of which includes a plurality of address elements. For example, the destination address 410 comprises a destination network field 412 that indicates the particular network over which the packet will travel, a destination node field 414 identifying a data link layer address of the receiving node on that network and a destination socket field 416 specifying the receiving process in the receiving node. Data field 430 is appended to the header, immediately following the source address field 420.

The IPX protocol header does not accommodate option fields and, thus, an arrangement is provided that expands the format of this header in a manner that is compatible with the remaining fields, e.g., the data field 430, of the packet. Specifically, the arrangement modifies the existing destination socket element of the conventional address to effectively create an improved network layer header. Such a modification maximizes the capabilities of routers configured to decipher the new information, while ensuring that conventional routers continue to operate on the contents of information fields constituting the conventional network layer headers.

Figure 5A:
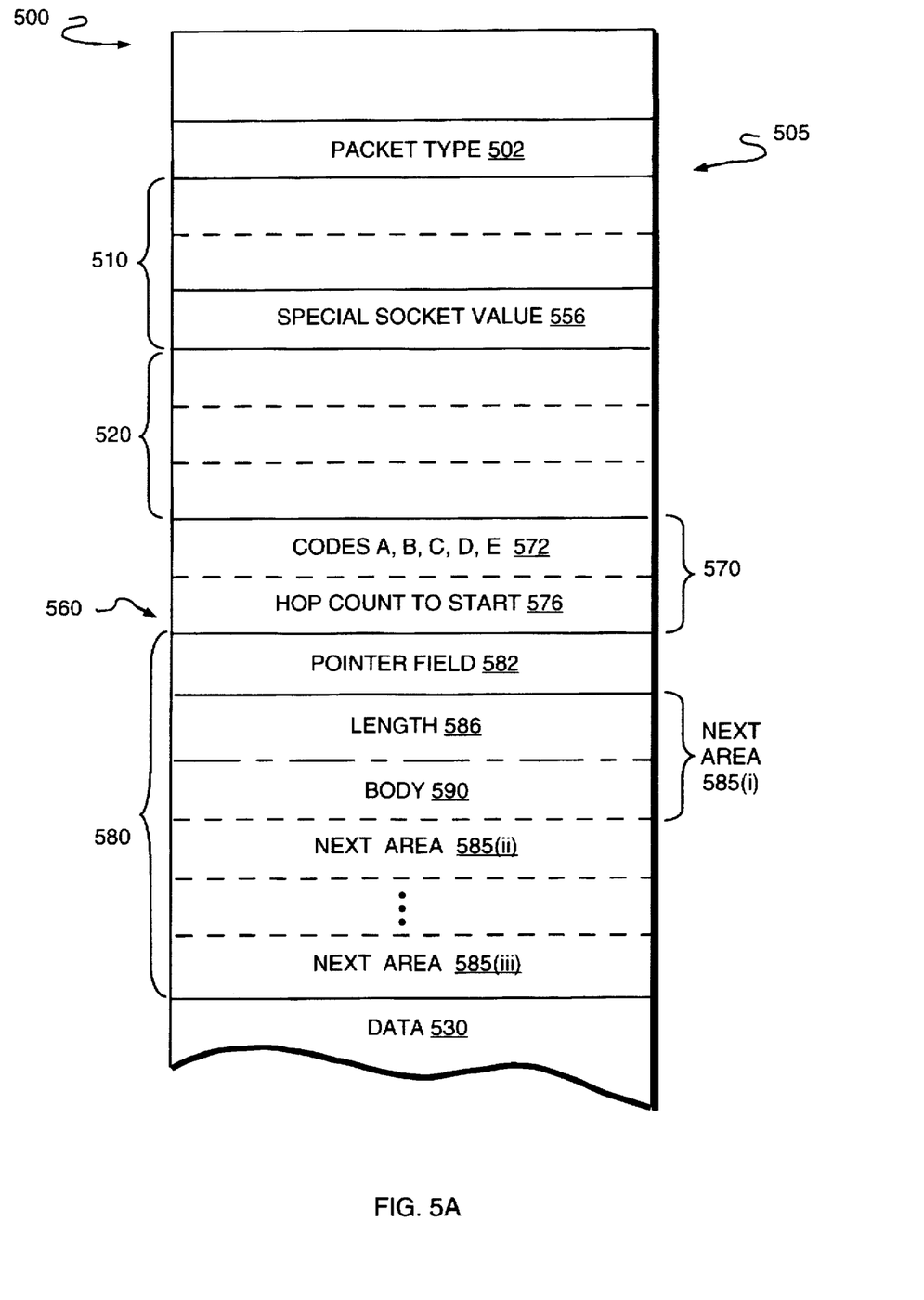
FIGS. 5A-5B are schematic diagrams illustrating an improved format of the IPX network layer header for implementing a novel probe packet configured to provide the information gathering mechanism of the present invention.

FIG. 5A is a schematic diagram illustrating the format of the improved network layer header 505. According to the novel arrangement, a special socket value 556 is provided to indicate the provision of additional header information after the source address fields of the packet. Preferably, a source node substitutes this special socket value for the actual destination socket number within the 2-byte destination socket field 416 of the conventional network layer destination address 410 (FIG. 4). More particularly, the special socket value instructs the routers to examine the contents of expanded header fields 560 prior to forwarding packets over the networks. For other network layer headers, such as IP and CLNP, header expansion may be indicated by special values for either version fields (see FIGS. 3A and 3B at 314 and 354, respectively) or type fields (shown at 316 and 356).

As noted in the case of connectionless network protocols, it is rather difficult to acquire useful characteristics pertaining to a particular network path. In accordance with the present invention, a novel mechanism is provided for efficiently acquiring information about a path interconnecting a source node and a destination node in a computer network. Specifically, the mechanism comprises a novel packet configuration for soliciting parameters pertaining to network characteristics from "hops", i.e., routers, coupled to the path. This novel probe packet 500 preferably incorporates the improved network layer header 505 to provide a flexible format that may be processed not only by routers configured to interpret this type of packet, but also those that are incapable of supplying some of the parameters and, further, deciphering any of the contents of the packet.

According to an aspect of the invention, the probe packet 500 includes a source instruction area 570 and a recording area 580 contained within the expanded header fields 560 appended to the network layer header 505. Specifically, the source instruction area 570 includes a field 572 containing a list of the network parameters to be collected. In the illustrative embodiment, the solicited parameters are specified by codes, examples of which are: (i) code A=the router's address; (ii) code B=on-demand link cost; (iii) code C=maximum packet size; (iv) code D=amount of bandwidth reserved; and code E=cost of utilizing a link. Additionally, the source instruction area 570 includes a field 576 specifying the hop count at which to start collecting those parameters.

The recording area 580, on the other hand, contains a pointer field 582 whose contents specify an offset address to the next area 585(i)-(iii) that is available for a router to supply its parameters. After each router "writes" its hop count number and parameter information to the specified area, it increments the contents of the pointer field 582 to reference a next area that is available for a next router to supply the requested information. Each next area 585(i)-(iii) generally includes a length field 586 indicating the length of the contents of the next area in bytes and a body field 590 containing those contents.

Figure 5B:
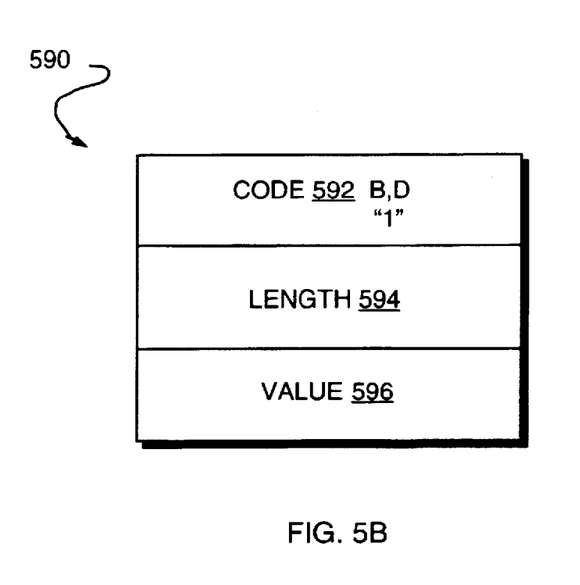

Furthermore, the format of each body field 590 is generally similar to that of the contents of options field 380. Referring to FIG. 5B, each body field 590 comprises a code field 592 that uniquely defines a type of option, while also specifying the network parameters for which information was supplied by a router, a length field 594 indicating the length of the supplied information in bytes, and a value field 596 containing the supplied information.

In the cases of the IP and CLNP network layer packets, a new option type is defined for the information gathering mechanism of the probe packet. Preferably, the option code field 382 contained within the options field 380 uniquely defines the probe packet as a type of option seeking probe information. The value field 386 preferably specifies the network parameters to be collected and the starting hop count for acquiring that desired information. The length of the option specified in the length field 384 changes as each router adds information to the value field 386. Each router is responsible for adjusting the length of the option in response to adding its information to the field 386.

By specifying the starting hop at which to provide parameter information, a source may regulate the information solicited from the routers. For example, assume the source wants to acquire information about a network path from all of the routers, e.g., eight routers, coupled to the path. Accordingly, the source specifies a starting hop count=1 and launches the probe packet. As each hop (router) provides the requested information, the areas 585 of the recording area 580 begin to fill; by the time the fifth router supplies its information (hop count=5), the packet is completely full and the remaining routers cannot add their requested information. The probe packet is therefore forwarded to the destination without any further additions to its content.

Upon receiving the probe packet, the destination node passes the gathered information back to the source within a return packet containing detailed information received from the first five hops. However, information was requested of the first eight hops; the source then launches another probe packet specifying the starting hop count=6 and the remaining routers (e.g., hops 6-8) supply the solicited parameters to the packet.

In another aspect of the invention, the probe packet is further marked to identify the packet as an information gathering mechanism. In the illustrative embodiment, the network layer header preferably contains an identifying mark provided by source S when generating the probe packet having an address of a destination D. For the IPX, CLNP and IP headers, the mark is preferably a new option type uniquely defined within the code fields 382, 592.

Operation of the novel information gathering mechanism will now be described in connection with FIGS. 2, 5A and 5B and, illustratively, the IPX probe packet 500. The source S launches its probe packet 500 over the network 200 where it is received by router R1 which may store the probe packet 500, at least temporarily, in a memory device, such as memory 204. Router R1 initially examines the packet to determine if it is a probe packet and, upon identifying this type of packet, checks the hop count to start field 576 to determine if it is requested to supply information. If so, R1 examines the list of network parameter codes in field 572 and proceeds to supply the information it is capable of supplying by writing it to the recording field referenced by the contents of the pointer field 582. For example and referring to FIG. 5B, R1 supplies information for codes B and D in body field 590 of the next area 585(i), prior to "signing" the supplied information with the designation hop count="1".

Upon supplying the information, router R1 then increments the pointer 582 to the next available field 585(ii) of the recording area 580 and forwards the packet 500 onto the next router R2. Router R2 supplies information for, e.g., codes A and B, signs the information (hop count="2") and then increments the pointer field 582 to the next available field. This procedure continues until router R5 provides information for codes A-E in next area 585(iii). Significantly, if a router is not configured to interpret the probe packet 500, it merely forwards that packet over the network 200 to the next specified hop without modifying the recording area field 580.

The probe packet is thereafter received at destination node D, which maintains its own pointer for processing the contents of the packet. That is, the destination identifies the contents of each next field 585 of the packet 500 by incrementing its pointer in response to the length information supplied by the routers. The destination therefore can confirm successful receipt of all information supplied by the routers when the contents of its pointer equal the contents of the pointer field 582 of packet 500.

In summary, routers that are configured to interpret the "marks" and accompanying network parameters of the novel probe packet may cooperate with this information gathering mechanism to supply significant information about a path in effectively one network operation. The novel mechanism is preferably configured to be backward compatible with routers unable to decipher the contents of the probe packet; as noted, such routers merely forward the packets onto the specified destination addresses.

Moreover, the probe packet has a flexible construction in that new capabilities may be continuously added for utilization by updated routers, while whatever information is capable of being supplied by "old" routers may be collected at a source.

While there has been shown and described illustrative embodiments for implementing a novel mechanism for efficiently acquiring information about a path interconnecting a source node and a destination node in a computer network, it is to be understood that various other adaptations and modifications may be made within the spirit and scope of the invention. For example, although the field 582 of the probe packet 500 is described as a pointer that may be incremented to reference the next available area 585 for routers to supply information, that field may be configured to contain the length of information supplied by a router. The contents of the field 582 will still function as an offset for the next router, which "skips" over that written area 585 to access available locations within the recording field 580 to provide its information.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A memory device, comprising:
   a probe packet for efficiently acquiring information about a path interconnecting a source and a destination in a computer network having routers coupled thereto, the probe packet including a network layer header, the probe packet comprising
   (i) a source instruction area appended to the header for storing network parameter information to be acquired and a list of routers for providing the network parameter information; and
   (ii) a recording area appended to the source instruction area for providing locations for the routers to record the network parameter information.

2. The memory device of claim 1 wherein the source instruction area comprises a field specifying a hop count at which to start collecting the network parameter information.

3. The memory device of claim 1 wherein the network parameter information to be acquired are specified by encoded bit fields within said source instruction area.

4. The memory device of claim 1 wherein the recording area comprises a pointer field whose contents specify an offset address to the next location available for a router to supply the network parameter information.

5. The memory device of claim 1 further comprising means for marking the packet as a probe packet.

6. The memory device of claim 5 wherein the means for marking comprises a new option type.

7. A memory device, comprising:
   a probe packet for efficiently acquiring information about a path interconnecting a source and a destination in a computer network having routers coupled thereto, the probe packet having a network layer header, the probe packet comprising
   a source instruction area appended to the header for storing a list of network parameters to be acquired and a list of routers for providing information regarding the network parameters, the source instruction area further comprising a field containing a hop count indicative of which router to start collecting the information; and
   a recording area appended to the source instruction area for providing locations for the routers to record the information regarding the network parameters, the recording area further comprising a pointer field whose contents specify an offset address to the next location available for a router to supply information,
   wherein the probe packet is processed by both routers configured to interpret the contents of the source instruction and recording areas, and routers that are incapable of one of supplying the information and deciphering the contents of the packet.

8. A method of efficiently acquiring information about a path interconnecting a source and a destination in a computer network having routers coupled thereto, the method comprising the steps of:
   generating a probe packet having a network layer header, the probe packet comprising a source instruction area appended to the header and a recording area appended to the source instruction area;
   storing a list of network parameter information to be acquired and a list of routers for providing the network parameter information within the source instruction area;
   providing locations for the routers to record the information within the recording area;
   launching the probe packet from the source to the destination over the network; and
   recording the information specified in the source instruction area within the locations of the recording area associated with routers selected to provide the information.

9. The method of claim 8 further comprising the step of specifying a hop count at which to start collecting the specified information within the source instruction area.

10. The method of claim 9 further comprising the step of identifying a next location for a router to supply information using a pointer field of the recording area.

11. A method of forming a probe packet for efficiently acquiring information about a path interconnecting a source and a destination in a computer network having routers coupled thereto, the probe packet including a network layer header, the method comprising the steps of:
   appending a source instruction area to the header for storing a list of network parameters to be acquired and a list of routers for providing information regarding the network parameters; and appending a recording area to the source instruction area for providing locations for the routers to record the information.

12. The method of claim 11, further comprising the step of appending a field to the source instruction area comprising a field which specifies a hop count at which to start collecting the information.

* * * * *